May 28, 1968  R. J. KERSTING  3,385,637

CONTROL VALVE

Filed July 11, 1966

INVENTOR
RAYMOND J. KERSTING
BY
*Joseph E. Papin*

United States Patent Office 3,385,637
Patented May 28, 1968

3,385,637
CONTROL VALVE
Raymond J. Kersting, Dellwood, Mo., assignor, by mesne assignments, to Wagner Electric Corporation, South Bend, Ind., a corporation of Delaware
Filed July 11, 1966, Ser. No. 564,242
16 Claims. (Cl. 303—6)

ABSTRACT OF THE DISCLOSURE

A control valve having a pair of resiliently urged means responsive to a predetermined value of fluid pressure applied through said control valve and fluid pressure supplied thereto to isolate the supplied and applied fluid pressures and thereafter responsive to the supplied fluid pressure in excess of the predetermined value to effect a metered increase in the applied fluid pressure, and said resiliently urged means being concertedly movable to disabled positions in response to increased applied fluid pressure predetermineately greater than the first named predetermined value to re-establish open pressure fluid communication between the supplied and applied fluid pressures.

---

Figure 1:
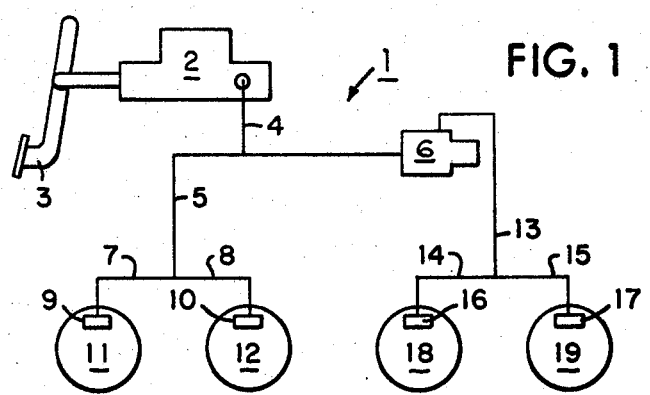

This invention relates to fluid pressure systems and more particularly to a control valve for use in such a fluid pressure system.

In the past, vehicles have been provided with a pair of dissimilar axle sets of friction devices actuated in response to fluid pressure applied thereto from the vehicle fluid pressure system and each axle set of said friction devices respectively required actuating fluid pressures of different magnitudes for initial friction device energization. Such past vehicle fluid pressure systems had the undesirable or disadvantageous feature of creating a time lag between the initial energization of one of the axle sets of friction devices relative to the other set thereof. In addition, these prior art fluid pressure systems had the undesirable feature during the release of the brakes of maintaining the fluid pressure at one of the axle sets of friction devices at a predetermined value while the fluid pressure at the other axle set of friction devices was decreasing so that a time lag between the de-energization of the axle sets of friction devices was also established.

It is therefore a general object of the present invention to provide a control valve for overcoming the aforementioned undesirable or disadvantageous features.

Another object of the present invention is to provide a control valve for effecting substantially simultaneous friction device energization and de-energization between dissimilar types of vehicle axle friction devices.

Another object of the present invention is to provide a novel control valve for use in a vehicle fluid pressure system having dissimilar sets of axle friction devices which controls the flow of displaced pressure fluid for effecting substantially simultaneous actuation of the dissimilar sets of axle friction devices and which controls the flow of displaced pressure fluid for effecting substantially simultaneous de-energization thereof.

Another object is to provide a novel control valve initially permitting pressure fluid flow to dissimilar axle sets of friction devices which, in response to fluid pressure sufficient to initially energize one set of axle friction devices, interrupts pressure fluid flow thereto and, in response to the attainment of another fluid pressure sufficient to initially energize the other axle set of friction devices, re-establishes pressure fluid flow to the one axle set of friction devices.

Still another object of the present invention is to provide a novel control valve of simplified construction and economy of manufacture.

These and other objects and advantages will become apparent hereinafter.

Briefly, the present invention embodies a control valve having a housing, and a pair of control means in said housing normally permitting pressure fluid flow therethrough, one of said control means being responsive to a predetermined fluid pressure to interrupt pressure fluid flow through said housing and said other control means being responsive to a fluid pressure predeterminately greater than the predetermined fluid pressure to re-establish pressure fluid flow through said housing.

Figure 2:
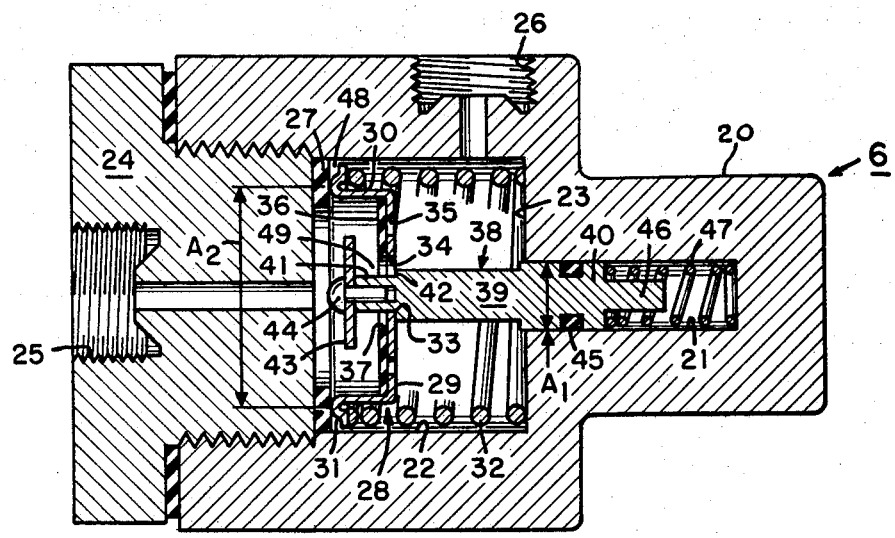
Figure 3:
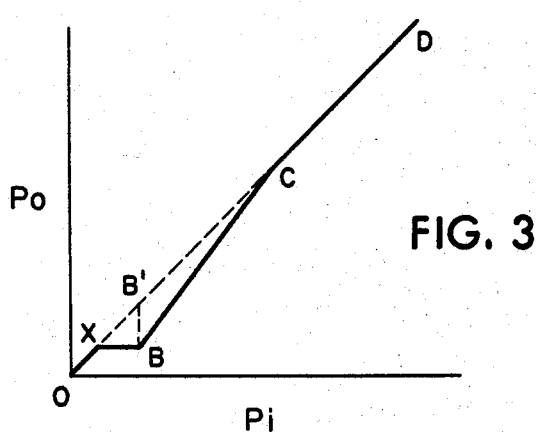

In the drawings which illustrate embodiments of the present invention,

FIG. 1 is a diagrammatic view of a fluid pressure system having a control valve therein embodying the present invention, FIG. 2 is a secondary view showing the control valve of FIG. 1 in cross-section, and FIG. 3 is a graphical representation of the fluid pressure system as effected by the embodiment of the control valve as shown in FIG. 2.

Referring to the drawings in detail and in particular to FIG. 1, a fluid pressure system 1 is provided with a fluid pressure generating means or master cylinder 2 which is manually actuated by a brake pedal 3 operatively connected therewith. A delivery conduit 4 is connected between the master cylinder 2 and another conduit 5 which has one end connected with the inlet port of a control or pressure inhibiting valve 6 and the other end thereof branches at 7, 8 for connection with servo motors or wheel cylinders 9, 10 of the rear brake assemblies 11, 12. Another conduit 13 has one end connected to the outlet port of the control valve 6 and the other end thereof branches at 14, 15 for connection with actuators 16, 17 of the front wheel brake assemblies 18, 19. It should be noted that the rear brake assemblies 11, 12 are of a different type than the front brake assemblies 18, 19 and the rear brake assemblies will have greater inherent resistances and therefore require a greater actuating pressure to effect the initial energization thereof than the front brake assemblies.

Referring now to FIG. 2, control valve 6 is provided with a housing 20 having an axially aligned bore and counterbore 21, 22 therein, and a radial shoulder 23 is formed at the juncture of said bore and counterbore. The rightward end of the bore 21 is closed by the housing 20, and the leftward end of the counterbore 22 is closed by plug member 24 threadedly received therein. An inlet port 25 which receives the conduit 4, as previously mentioned, is provided in the plug member 24 and connects with the leftward end of the counterbore 22, and an outlet port 26 which receives the conduit 13, as previously mentioned, is provided in the housing 20 connecting with the counterbore 22 adjacent to the shoulder 23. A diaphragm or valve seat member 27 is provided in the housing counterbore 22 adjacent to the rightward end of the plug member 24 and in circumscribing relation with the inlet port 25.

A valve or flow control member, indicated genreally at 28, is provided in the housing counterbore 22 having a body portion 29 and an axially extending side portion 30. The rightward end of the side portion 30 connects with the body portion 29 and the leftward end thereof defines a valve element or sealing portion 31 for sealing engagement with the valve seat member 27. A pre-loaded spring 32 is in concentric alignment with the side portion 30 and is biased between the leftward end 31 of the flow control member 28 and the housing shoulder 23 normally urging the sealing portion 31 into sealing engagement with the valve seat member 27. A centrally located aperture 33 having a plurality of passage 34 adjacent thereto is provided through the body portion 29 of the flow control member 28, and a plurality of relief passages 35 extend through said body portion between said aperture and the side portion 30. A seal or flapper valve member 36 is provided in the flow control member 28, and the side portion 30 is in circumscribing relation to the outer periphery of said valve member. The valve member 36 is normally adjacent to the body portion 29 in a position preventing pressure fluid flow through the relief passages 35, and a centrally located aperture 37 is provided in said valve member in substantial axial alignment with the passages 34 in the flow control member 28.

Another valve or flow control member, indicated generally at 38, is provided with a body portion 39 having a rightward end 40 slidably received in the housing bore 21 and a reduced leftward end 41 which defines an annular shoulder 42 at its juncture with said body portion. The leftward end 41 extends coaxially into the housing counterbore 22 and through the aperture 33 in the flow control member 28 and the aperture 37 in the valve member 36. A valve head or sealing member 43 is provided on the leftward end 41 by suitable means, such as a pin 44, and said sealing member is sealingly engageable with the valve member 36. A seal 45 is provided on the rightward end 40 of the flow control member 38 in sealing engagement with the housing bore 21, and an abutment 46 is provided on said rightward end for engagement with the housing 20 to limit the rightward movement of the flow control member 38. A return spring 47 is biased between the rightward end 40 and the leftward end 41 of the housing bore 21 normally urging the shoulder 42 into engagement with the flow control member 28 and normally urging the sealing member 43 to a position spaced from the valve member 36. It should be noted that an effective fluid pressure responsive area $A_1$ is defined on the flow control member 38 across the seal 45 and that another effective fluid pressure responsive area $A_2$ is defined by the flow control member 28 across the sealing portion 31. To complete the description of the control valve 6, it should be noted that a flow passage 48 is provided between the inlet and outlet ports 25, 26 through the housing counterbore 22 past the sealing element 31 and the valve seat member 27, and said flow passage is normally closed by the sealing member 31 engaging the valve seat 27, and that another flow passage 49 connecting said inlet and outlet ports is defined through the housing counterbore 22 between the two flow control members 28, 38 by the aperture 37 in the valve member 36 and the passages 34 in the flow control member 28 and that the flow passage 49 is normally open.

In the operation with the component parts of the system 1 and the control valve 6 in their normal inoperative positions, as described hereinbefore and as shown in FIGS. 1 and 2, a manually applied force on the brake pedal 3 displaces pressure fluid from the master cylinder 2 through the conduits 4, 5, 7 and 8 into the wheel cylinders 9, 10 to effect energization of the rear wheel brake assemblies 11, 12. The displaced pressure fluid also flows from the conduit 5 through the inlet port 25 of the control valve 6 and through the flow pasage 49 which includes the housing counterbore 22, aperture 37 in the valve member 36 and the passage 34 in the flow control member 28, to the outlet port 26. The displaced pressure fluid flows from the outlet port 26 through the conduits 13, 14 and 15 to the actuators 16, 17 to effect energization of the front wheel brake assemblies 18, 19. Since it is assumed that the rear wheel brake assemblies 11, 12 have greater inherent resistances than those of the front wheel brake assemblies 18, 19 due to the design thereof, said front wheel brake assemblies will be initially energized in response to a fluid pressure which is predeterminately less or smaller than that required to effect the initial energization of said rear wheel brake assemblies.

When the input and output fluid pressure $Pi$ and $Po$ at the inlet and outlet ports 25, 26 attain a predetermined value X acting on the effective area $A_1$ of the flow control member 38, a force $F_1$ is established urging said flow control member rightwardly toward an operative position against the force $Fs$ of the spring 47. This rightward movement of the flow control member 38 moves the valve head 43 into sealing engagement with the valve member 36 serving to close the flow passage 49 and interrupt pressure fluid communication between the inlet and outlet ports 25, 26, thereby inhibiting further energization of the front brake assemblies 18, 19. Further increases in the input fluid pressure $Pi$ act on the valve head 43 to maintain it in sealing engagement with the valve member 36, and the input fluid pressure $Pi$ acts on the effective area $A_2$ to create a force $F_2$ urging the flow control member 28 rightwardly. The output fluid pressure $Po$ is also effective on the fluid pressure area $A_2$ of the flow control member 28 and establishes a force $F_3$ serving to urge said flow control member leftwardly in opposition to the force $F_2$.

With the valve member 43 in its operative position interrupting pressure fluid communication between the inlet and outlet ports 25, 26, as described hereinabove, further actuation of the master cylinder 2 to increase the input fluid pressure $Pi$ results in a corresponding increase in the magnitude of the force $F_2$ and since said valve member is in its operative sealing position, the output fluid pressure $Po$ remains constant at the predetermined value X. When the input fluid pressure $Pi$ is increased to a value B' predeterminately greater than the value X of the output fluid pressure $Po$, the increased force $F_2$ plus the force $F_1$ overcome the opposing force $F_3$ plus the forces $Fs$ and $Fc$ of the springs 47 and 32, respectively, to move the flow control member 28 rightwardly to a position disengaged from the valve seat 27 thereby opening the by-pass flow passage 48 to allow additional fluid pressure to pass therethrough to the outlet port 26. As a result of the by-pass passage 48 opening, an increase in the output fluid pressure $Po$ occurs which, due to the relationship of the effective areas $A_1$ and $A_2$, predeterminately increases the force $F_3$ more than the force $F_1$ so that forces $Fc$ and $F_3$ overcome the opposing forces $F_1$ and $F_2$ to again move the flow control member 28 leftwardly to sealably re-engage the seal element 31 with the valve seat 27 closing the by-pass passage 48. It should be noted that since the opposing forces $F_2$ and $F_3$ are established by the input and output fluid pressures $Pi$ and $Po$ respectively acting on the effective area $A_2$, a predetermined fluid pressure differential would normally be maintained on opposite sides of the flow control member 28 due to the relatively constant force $Fc$ of the spring 32 acting thereon. However, the force $F_1$ acting through the flow control member 38 and the head portion 43 has the effect of pulling the flow control member 28 rightwardly in opposition to the force $Fc$, and each time the by-pass passage 48 is opened the force $F_1$ is incrementally increased thereby reducing the effect of the force $Fc$ on the flow control member 28. As the effect of the force Fc on the flow control member 28 is reduced, there is a corresponding incremental decrease of the fluid pressure differential between the input and output fluid pressures Pi and Po on opposite sides of said control member, and the incremental increases in the input fluid pressure Pi required to actuate said control member come progressively smaller as the input fluid pressure increases. Therefore, further incremental increases in the input fluid pressures Pi will effect further actuation of the control member 28 to open and close the by-pass passage 48 resulting in further incremental increases in the output fluid pressure Po and force $F_1$ so that the force differential across the control member 28 is correspondingly decreased in increments. When the magnitude of the input fluid pressure Pi is increased to a value C predeterminately greater than the predetermined value X thereof, the sealing portion 31 of the control member 28 is again disengaged from its seat 27, as discussed hereinbefore, increasing the force $F_1$ to a magnitude balancing that of the opposing relatively constant force Fc of the spring 32 to re-establish pressure fluid communication between the inlet and outlet ports 25, 26 through the passage 48 and to equalize the input and output fluid pressures Pi, Po. Upon movement of the control member 28 to its open or operative position with the forces $F_1$ and Fc balanced and the forces $F_2$ and $F_3$ eliminated due to the equalized input and output fluid pressures Pi and Po, the force differential across the control member is equalized and said control member will thereafter remain in its open position permitting pressure fluid communication between the inlet and outlet ports 25, 26 through the passage 48. It is apparent that any increase in the input fluid pressure Pi in excess of the predetermined value C results in an equal increase in the output fluid pressure Po with the magnitudes thereof equal to effect a direct proportion between the intensities of the braking application at the rear and front wheel brake assemblies 11, 12 and 18, 19.

If the operator during a braking application should desire not to make a complete release of the brake application, a reduction of the manually applied force on the brake pedal 3 results in a reduction in the input fluid pressure Pi. If the input fluid pressure Pi is maintained above the value C, the control valve 6 has no effect on the fluid pressure since the by-pass passage 48 is open and the input and output fluid pressures Pi, Po are equal. However, when the input fluid pressure Pi is decreased to a value somewhere between the value B' and C the control member 28 has closed the by-pass passage 48 and the control member 38 has not as yet opened the passage 49 so that the outlet fluid pressure Po would be maintained at the value C were it not for the relief passages 35. The relief passages 35 are normally closed by the valve member 36 and when the output fluid pressure Po acting on the right side of said valve member exceeds the value of the input fluid pressure Pi acting on the left side of said valve member, said valve member is urged to a position permitting pressure fluid flow through said relief passages until the input and output fluid pressures Pi, Po are equal. Thus, the relief passages maintain the input and output fluid pressures Pi, Po substantially equal during a brake release and the front and rear brake assemblies 18, 19 and 11, 12 are de-energized in substantially the same manner.

When the braking application is attained and a total release is desired, the manually applied force is removed from the brake pedal 3 to permit the return flow of displaced pressure fluid to the master cylinder 2 which serves to exhaust or eliminate the input and output fluid pressures Pi, Po. The elimination of the input and output fluid pressures Pi, Po, of course, effects the elimination of the force $F_2$, permitting the force Fc of the spring 32 to return the control member 28 to its original inoperative position with the sealing element 31 engaging the valve seat 27 enclosing the by-pass passage 48. The elimination of the input fluid pressure Pi also permits the output fluid pressure Po to urge the valve member 36 away from the relief passages 35 and permits the return of pressure fluid through said relief passages. When the output fluid pressure attains the value B', the force Fs of the spring 47 returns the control member 38 to its original position disengaging the valve element 43 from the valve member 36 and establishing pressure fluid flow through the passage 49. The return flow of displaced fluid pressure through the relief passage 35 and the passage 49 is effected to de-energize the front wheel brake assemblies 18, 19 and the pressure fluid flows from the actuators 16, 17 thereof through conduits 14, 15 and 13 to the outlet port 26 of the control valve 6 and therefrom through the relief passages 35 and the passage 49 into the inlet port 25. This return flow of displaced pressure fluid flows from the inlet port 25 through conduits 5 and 4 back into the master cylinder 2, and at the same time displaced pressure fluid is also returned to said master cylinder through the conduits 7, 8, 5 and 4 from the wheel cylinders 9, 10 to effect substantially simultaneous de-energization of the rear wheel brake assemblies 11, 12.

As illustrated by the graphical representation of the braking pressure of FIG. 3, until the displaced pressure fluid attains the value X the output fluid pressure Po from the control valve 6 to the front brakes 18, 19 is in direct proportion, i.e., a 1:1 ratio, with the input fluid pressure Pi to the rear brakes 11, 12, as shown by the line OX. This predetermined fluid pressure X is equivalent to the fluid pressure required to overcome the inherent resistances of the front brakes 18, 19 and to effect initial energization thereof. When this predetermined fluid pressure X is attained, the flow control member 38 has moved rightwardly to sealably engage the valve element 43 with its valve seat 36 interrupting pressure fluid communication between the inlet and outlet ports 25, 26 through the flow passage 49 and thereby interrupting pressure fluid communication between the rear and front brakes 11, 12 and 18, 19. The output fluid pressure Po to the front brakes 18, 19 remains substantially constant, as shown by the line XB, while the input fluid pressure Pi to the rear brakes 11, 12 is increased, as shown by the line XB'. When the input fluid pressure Pi attains the value B', which is the fluid pressure required to overcome the inherent resistances of the rear brakes 11, 12, the incremental fluid pressure by-passing operation of the control valve 6 is effected, as previously described, providing a proportional increase between the input and output fluid pressures Pi, Po, as evidenced by the lines B'C and BC, respectively. In other words, a predetermined incremental increase in the input fluid pressure Pi, as shown by the line B'C, occasions a predetermined incremental increase in the output fluid pressure Po, as shown by the line BC, and the value C is the fluid pressure at which the force Fc of the spring 32 is overcome to maintain the by-pass passage 48 open and equalize the input and output fluid pressures Pi, Po. Thereafter, any further increase in the pressure fluid in the brake system 1 is simultaneously effective at the rear and front brake assemblies 11, 12 and 18, 19, as shown by the line CD.

From the foregoing, it is now apparent that a novel control valve meeting the objects and advantages set out hereinbefore, as well as other objects and advantages apparent in the disclosure, is provided and that changes or modifications as to the precise configurations, shapes and details of the construction set forth in the disclosure by way of illustration may be made by those skilled in the art without departing from the spirit of the invention, as defined by the claims which follow.

I claim:

1. A control valve comprising a housing having a pressure fluid flow passage therethrough, a pair of flow control members movable in said passage, said members defining therebetween another flow passage through said housing, one of said members being movable relative to the other of said members in response to a predetermined applied fluid pressure to a position interrupting pressure fluid communication through said other passage, said other member being movable with said one member in response to an applied fluid pressure predeterminately greater than the predetermined fluid pressure toward a position establishing pressure fluid flow through said first named passage, a valve seat on said other member about said other passage, said valve seat being engaged by said one member upon the relative movement thereof to interrupt pressure fluid communication through said other passage, and resilient means normally urging said one member toward a position disengaged from said valve seat and establishing pressure fluid communication through said other passage.

2. The control valve according to claim 1, including another valve seat on said housing in said first named passage, and other resilient means normally urging said other member into engagement with said other valve seat to interrupt pressure fluid communication through said first named passage.

3. A control valve comprising a housing having a pair of ports therein, a pair of resiliently urged means concertedly and relatively movable in said housing and controlling pressure fluid communication between said ports, one of said resiliently urged means being movable relative to the other of said resiliently urged means in response to a predetermined fluid pressure at said ports to a position interrupting pressure fluid communication therebetween, said one and other resiliently urged means being thereafter concertedly movable in response to fluid pressure at one of said ports predeterminately greater than the predetermined fluid pressure to a position establishing pressure fluid communication between said ports, and passage means through said other resiliently urged means connecting said ports in pressure fluid communication, said one resiliently urged means extending through said passage means and normally permitting pressure fluid communication between said ports therethrough.

4. The control valve according to claim 3 including a valve seat on said other resiliently urged means about said passage means, and a valve head on said one resiliently urged means engageable with said valve seat to interrupt pressure fluid communication through said passage means.

5. The control valve according to claim 3 including other passage means in said housing between said ports, and another valve seat in circumscribing relation with said other passage means, said other resiliently urged means normally engaging said other valve seat to interrupt pressure fluid communication between said ports.

6. The control valve according to claim 3 including relief passage means in said other resiliently urged means between said ports, and valve means controlling pressure fluid communication through said relief passage means, said valve means being movable to establish pressure fluid communication through said relief passage means when the fluid pressure at said one port is reduced below the fluid pressure at said other port.

7. The control valve according to claim 6 including other passage means in said other resiliently urged means between said ports, and a valve seat on said valve means about said other passage means, said valve seat being engaged by said one resiliently urged means upon the relative movement thereof to close said other passage means.

8. A control valve comprising a housing, a pair of resiliently urged means concertedly and relatively movable in said housing and controlling the application through said housing of fluid pressure supplied thereto, one of said resiliently urged means being relatively movable in response to supplied and applied fluid pressures of a predetermined value toward a position in engagement with the other of said resiliently urged means interrupting pressure fluid flow through said housing and isolating the applied fluid pressure from the supplied fluid pressure, said resiliently urged means defining with said housing passage means for communicating the supplied and applied fluid pressures following movement of said one resiliently urged means to its flow interrupting position in engagement with said other resiliently urged means, said resiliently urged means being thereafter concertedly movable in said housing in response to supplied fluid pressure in excess of the predetermined value to effect the application through said passage means of the supplied fluid pressure in excess of the predetermined value, and means on said one resiliently urged means responsive to an increase of the applied fluid pressure to another predetermined value in excess of the first named predetermined value thereof for concertedly moving said resiliently urged means against their own forces toward inoperative positions providing unrestricted pressure fluid communication between the supplied and applied fluid pressures through said passage means.

9. A control valve comprising a housing having a pressure fluid flow passage therethrough, a pair of resiliently urged means concertedly and relatively movable in said flow passage and normally effecting an unrestricted application therethrough of fluid pressure supplied thereto, one of said resiliently urged means being relatively movable in response to supplied and applied fluid pressures of a predetermined value toward a position in engagement with the other of said resiliently urged means closing said flow passage and isolating the applied fluid pressure from the supplied fluid pressure, said resiliently urged means also defining with said housing another pressure fluid flow passage in by-pass relation with said first named flow passage for communicating the supplied and applied fluid pressures subsequent to the engagement of said resiliently urged means closing said first named flow passage, said resiliently urged means being thereafter concertedly movable in response to supplied fluid pressure in excess of the predetermined value to effect the application thereof through said other flow passage, and one of said one and other resiliently urged means including means responsive to an increase of the applied fluid pressure to another predetermined value in excess of the first named predetermined value thereof to establish a disabling force for concertedly moving said resiliently urged means toward disabled positions in said other flow passage establishing the unrestricted application therethrough of the supplied fluid pressure.

10. The control valve according to claim 9, comprising a valve seat on said other resiliently urged means in circumscribing relation with said first named flow passage, and valve means on said one resiliently urged means for engagement with said valve seat, said valve means being movable into engagement with said valve seat to close said first named flow passage upon actuation of said one resiliently urged means in response to the first named predetermined value of the supplied and applied fluid pressures.

11. The control valve according to claim 10, comprising passage means in said other resiliently urged means defining a portion of said first named flow passage and extending through said valve seat, said one resiliently urged means including piston means movable in said housing, extension means on said piston means and extending through said passage means, said valve means being on said extension means, and resilient means engaged with said piston means and normally urging said valve means toward a position disengaged from said valve seat, said piston means being movable against said resilient means in response to the first named predetermined value of the supplied and applied fluid pressures acting thereon to effect the engagement of said valve means with said valve seat closing said passage means and isolating the applied fluid pressure from the supplied fluid pressure.

12. The control valve according to claim 9, comprising a valve seat on said housing in circumscribing relation with said other flow passage, and valve means on said other resiliently urged means normally engaged with said valve seat closing said other flow passage, said valve means being initially moved toward a position disengaged from said valve seat to effect the application through said other flow passage of the supplied fluid pressure upon the concerted movement of said resiliently urged means in response to the supplied fluid pressure in excess of the first named predetermined value and also being thereafter further movable toward another position disengaged from said valve seat to establish the unrestricted application through said other flow passage of the supplied fluid pressure upon the movement of said resiliently urged means to their disabled positions in response to the establishment of the disabling force, 13. The control valve according to claim 12, wherein said other resiliently urged means includes a member movable in said housing and having passage means therethrough defining a portion of said first named flow passage, said one resiliently urged means being movable into engagement with said member to close said passage means upon its actuation in response to the first named predetermined value of said supplied and applied fluid pressures acting thereon, said valve means being on said member and in circumscribing relation with said passage means, and resilient means engaged with said member and normally urging said valve into engagement with said valve seat closing said other flow passage, said member being movable against said resilient means and concertedly movable with said one resiliently urged means when said one resiliently urged means is engaged therewith to close said passage means in response to the supplied fluid pressure in excess of the first named predetermined value acting thereon, respectively, to disengage said valve means from said valve seat and effect the application of the supplied fluid pressure through said other flow passage, and said valve means also being movable toward a disabled position disengaged from said valve seat to establish the unrestricted application through said other flow passage of said supplied fluid pressure upon the movement of said member against said resilient means and concertedly with said one resiliently urged means toward their disabled positions in response to the establishment of the disabling force.

14. The control valve according to claim 9, a first valve seat on said other resiliently urged means in circumscribing relation with said first named flow passage, first valve means on said one resiliently urged means for engagement with said first valve seat, said first valve means being movable into engagement with said first valve seat closing said first named flow passage upon the movement of said one resiliently urged means in response to the first named predetermined value of the supplied and applied fluid pressures, a second valve seat on said housing in circumscribing relation with said other flow passage, and second valve means on said other resiliently urged means normally engaged with said second valve seat closing said other flow passage, said second valve means being disengaged from said second valve seat to effect the application through said other flow passage of the supplied fluid pressure upon the concerted movement of said resiliently urged means in response to supplied fluid pressure acting thereon in excess of the first named predetermined value and said second valve means also being movable toward a disabled position disengaged from said second valve seat to establish the unrestricted communication of the supplied and applied fluid pressures through said other flow passage upon the concerted movement of said resiliently urged means to their disabled positions in response to the establishment of the disabling force.

15. The control valve according to claim 14, wherein said other resiliently urged means includes a member movable in said housing, passage means in said member defining a portion of said one flow passage, said first valve seat being on said member in circumscribing relation with said passage means, said second valve means being defined on said member spaced from said first valve seat and also in circumscribing relation with said passage means, and first resilient means engaged with said member and normally urging said second valve means into engagement with said second valve seat closing said other flow passage, and said one resiliently urged means including piston means movable in said housing, extension means on said piston means and having a portion movable in said passage means, said first valve means being on said extension means portion for engagement with said first valve seat, and second resilient means engaged with said piston means and normally urging said first valve means toward a position disengaged from said first valve seat, said piston means being movable against said second resilient means and relative to said member in response to the first named predetermined value of the supplied and applied fluid pressures acting thereon to engage said first valve means with said first valve seat closing said passage means and isolating the applied fluid pressure from the supplied fluid pressure, and said member and piston means being thereafter concertedly movable against said first and second resilient means in response to the supplied fluid pressure in excess of the first named predetermined value, respectively, to disengage said second valve means from said second valve seat establishing the application through said other flow passage of the supplied fluid pressure and said member and piston means also being further concertedly movable toward their disabled positions in response to the establishment of the disabling force to maintain said second valve means in a disabled position disengaged from said second valve seat establishing the unrestricted communication between the supplied and applied fluid pressures through said other flow passage.

16. A control valve comprising a housing having a bore and an axially aligned counterbore therein, a shoulder on said housing between said bore and counterbore, a closure member connected with said housing and defining an end wall of said counterbore axially spaced from said shoulder, an inlet port in said closure member and extending through said end wall in pressure fluid communication with said counterbore, an outlet port connected with said counterbore adjacent to said shoulder, a valve seat on said end wall in circumscribing relation with said inlet port, a member movable in said counterbore including an annular side portion, a radially inwardly extending flange connected with said side portion at one end thereof, aperture means extending through said flange, another valve seat on said flange about said aperture means, and an annular flange on the other end of said sleeve portion defining valve means for engagement with said first named valve seat, spring means engaged between said shoulder and said member normally urging said valve means into engagement with said first named valve seat, another member including piston means slidable in said bore, extension means on said piston means having a free end portion extending into said counterbore and through said aperture means, and other valve means on said free end portion for engagement with said other valve seat, and other spring means engaged with said other member normally urging said other valve means toward a position disengaged from said other valve seat and establishing unrestricted pressure fluid communication between said inlet and outlet ports, said other member being movable against said other spring means in response to fluid pressure at said inlet and outlet ports of a predetermined value to engage said other valve means with said other valve seat closing said aperture means and isolating said inlet port from said outlet port, said first named and other members being thereafter concertedly movable against said first named and other spring means in response to fluid pressure at said inlet port in excess of the predetermined value, respectively, to disengage said first named valve means from said first named valve seat and establish metered pressure fluid communication between said inlet and outlet ports, and other means on said other member responsive to an increase in the fluid pressure at said outlet port to another predetermined value in excess of the first named predetermined value for concertedly moving said first named and other members against said first named and other spring means toward disabled positions in said housing, said first named valve means being disengaged from said first named valve seat to re-establish unrestricted pressure fluid communication between said inlet and outlet ports when said first named and other members are in their disabled positions.

References Cited

UNITED STATES PATENTS

| | | | |
|---|---|---|---|
| 919,036 | 4/1909 | Langer | 137—512.2 XR |
| 1,356,298 | 10/1920 | McGregor | 137—512.2 XR |

MILTON BUCHLER, *Primary Examiner.*

FERGUS S. MIDDLETON, *Examiner.*

J. J. McLAUGHLIN, *Assistant Examiner.*

UNITED STATES PATENT OFFICE
CERTIFICATE OF CORRECTION

Patent No. 3,385,637                          May 28, 1968

Raymond J. Kersting

It is hereby certified that error appears in the above numbered patent requiring correction and that the said Letters Patent should read as corrected below.

Column 2, line 28, for "secondary" read -- sectional --; column 3, line 19, for "passage" read -- passages --; column 4, line 18, for "pressure" read -- pressures --; column 5, line 9, for "pressures" read -- pressure --; line 75, for "enclosing" read -- closing --; column 10, line 52, for "sleeve" read -- side --.

Signed and sealed this 6th day of May 1969.

(SEAL)
Attest:

Edward M. Fletcher, Jr.

Attesting Officer

Commissioner of Patents